United States Patent [19]

Wessling

[11] 4,077,974

[45] Mar. 7, 1978

[54] PROCESS FOR THE HALOGENATION OF COPPER PHTHALOCYANINE

[75] Inventor: Diether Wessling, Cologne, Germany

[73] Assignee: Bayer Aktiengesellschaft, Leverkusen, Germany

[21] Appl. No.: 621,800

[22] Filed: Oct. 14, 1975

[30] Foreign Application Priority Data

Oct. 16, 1974 Germany .............................. 2449133

[51] Int. Cl.$^2$ ............................................ C09B 47/10
[52] U.S. Cl. ................................................. 260/314.5
[58] Field of Search ..................................... 260/314.5

[56] References Cited

U.S. PATENT DOCUMENTS

3,332,961  7/1967  Glambalvo et al. ............. 260/314.5

OTHER PUBLICATIONS

Moser et al., "Phthalocyanine Compounds", pp. 172 to 179, Reinhold Publishing Corp., NY (1963).

*Primary Examiner*—Richard L. Raymond
*Attorney, Agent, or Firm*—Plumley and Tyner

[57] ABSTRACT

An improved process for the perhalogenation of copper phthalocyanine is characterized in that the halogenation is carried out in an aluminum chloride/sulphuryl chloride mixture which contains 8 to 25% by weight of an anhydrous alkali metal halide, relative to the amount of aluminium chloride.

3 Claims, No Drawings

PROCESS FOR THE HALOGENATION OF COPPER PHTHALOCYANINE

It is known that the blue colour shade of the Cu phthalocyanine molecule can be displaced to yellow by introducing halogen atoms.

From a tinctorial point of view, it is particularly the green to yellow-green shades of approximately perhalogenated Cu phthalocyanine which are of interest. To prepare these valuable dyestuffs one endeavours, during halogenation, to approach as close as possible to the maximum number of 16 halogen atoms per phthalocyanine molecule. Because of the degradation of the phthalocyanine molecule which starts during the perhalogenation the reaction is normally terminated at a stage at which on average 15 to 15.5 halogen atoms have been bonded per phthalocyanine molecule.

The literature mentions a large number of predominantly inorganic compounds as halogenation media; amongst these, Friedel-Crafts catalysts are particularly suitable, for example the halides of aluminium, iron, zinc and antimony. Of these salts, the halides of aluminium, especially its chloride, have found the greatest acceptance in industry.

To lower the melting point, fluxes are usually added to the aluminium chloride, of which the most important can be classified under the following two groups:

1. Alkali metal halides, preferably sodium chloride (German Patent Specification No. 717,164, BIOS Final Report No. 960, page 49, U.S. Patent Specification No. 2,247,752, French Patent Specification No. 1,263,272 and DT-AS (German Published Specification) No. 1,231,371).
2. Sulphur compounds which contain oxygen and/or halogen, preferably sulphur dioxide, sulphuryl chloride and thionyl chloride (French Patent Specification No. 1,466,390, British Patent Specification No. 867,035, DT-AS (German Published Specification) No. 1,250,032, U.S. Patent Specification Nos. 2,873,279 and 3,332,961).

The first process has the advantage that during the halogenation at temperatures above 150° C the reaction mixture is always liquid. However, it is a disadvantage that considerable energy and time have to be expended to fuse the aluminium chloride/sodium chloride mixture. The halogenation reaction is carried out at the relatively high temperature of 180° to 200° C and gives a product which, without expensive after-treatment, is unusable for pigmentation purposes.

In the second process, a liquid medium is present from the start, so that the unproductive periods required for melting are dispensed with; it is possible to work at a substantially lower temperature (about 120° C) and the crude product obtained if the reaction is carried out in this way is of particularly advantageous quality for conversion to the form in which it is finally used.

However, it is a disadvantage of carrying out the reaction in this way that the viscosity of the reaction mixture rises as the reaction time progresses and that crusts which interfere with heat transfer and make temperature measurement and temperature regulation more difficult, deposit on the walls of the reaction vessel.

This adverse development during the chlorination will be explained in more detail for the example of an aluminium chloride/sulphuryl chloride melt.

In the presence of aluminium chloride, sulphuryl chloride decomposes, particularly above its boiling point of 70° C, largely into $SO_2$ and $Cl_2$. Whilst the chlorine, depending on the reaction temperature and on the amount of other halogens which may be present, either chlorinates the phthalocyanine or passes into the off-gas, the $SO_2$ forms complexes with aluminium chloride, which result in the reaction melt being of low viscosity even above the boiling point of sulphuryl chloride. However, these aluminium chloride/sulphur dioxide complexes eliminate sulphur dioxide, especially at the higher reaction temperatures required for perhalogenations and over the long reaction times required for large industrial batches. As a consequence, the halogenation melts become very viscous, form crusts on the kettle walls which make it difficult to regulate the temperature and heat up considerably as a result of absorbing the energy expended on stirring. As a result of the poorer mixing of the melt which this causes, larger amounts of halogen are required than in the case of the liquid melts.

The melts can be re-liquefied by carefully adding further sulphuryl chloride. Since, however, the temperature of the reaction mixture is far above the boiling point of sulphuryl chloride (69°-70° C), the latter evaporates rapidly and is accordingly only partially taken up by the melt and therefore does not liquefy the melt to the desired degree and instead represents an additional contamination of the off-gas. Furthermore, the melt assumes a chlorination potential which cannot be defined accurately as a result of the addition of further sulphuryl chloride, and this can lead to undesired phthalocyanine degradation products towards the end of the chlorination reaction.

Another possible way of liquefying the melt is to introduce sulphur dioxide during the halogenation, as a result of which aluminium chloride/sulphur dioxide complexes are again formed. The continuous addition of $SO_2$, which is matched approximately by an equal amount of $SO_2$ eliminated, however also represents a contamination of the off-gas.

It has now been found that a form of crude perhalogeno-copper phthalocyanine which is advantageous from the point of view of conditioning is obtained at a low temperature, without the disadvantages in carrying out the reaction which have been described above, if the halogenation is carried out in an aluminium chloride/sulphuryl chloride mixture to which 8 to 25% by weight, preferably 10 to 15% by weight, of an anhydrous alkali metal halide, relative to the amount of aluminium chloride employed, are added. Relative to the aluminium chloride, at least 70% by weight, preferably 80% by weight, of sulphuryl chloride are added. From a chemical point of view, an upper limit cannot be specified but for technical and economic reasons it is advisable to employ not more than 120% by weight. Surprisingly, a reaction medium is obtained which is of low viscosity over the course of the entire reaction time, but at least for several days, and to which no further sulphuryl chloride or sulphur dioxide has to be added, though in the case of the preferred use of only 12 to 13% of NaCl (relative to $AlCl_3$) the composition is clearly outside the low-melting eutectic mixtures containing about 20 to 21% of NaCl, such as are usually employed with the pure $AlCl_3$/NaCl chlorination melts.

The alkali metal halide can be added from the start or only when the viscosity begins to rise. In the latter case, the liquefaction of the melt occurs within 5 to 15 minutes so that the effect can be readily controlled and the minimum requisite amount of alkali metal halide can easily be ascertained. Advantageously, an amount of alkali metal halide which is near the lower limit of effectiveness is added immediately when preparing the reaction mixture and, if the reaction times are very long, some more alkali metal halide is added later if appropriate.

Sodium chloride can in particular be used as the alkali metal halide, but it is also possible to use, for example, potassium chloride, potassium bromide and sodium bromide.

The halogenation can consist of a pure chlorination by passing in elementary chlorine or of a mixed chlorination and bromination, in which bromine is added.

The reaction is suitably carried out at temperatures between 90° and 150° C.

Compared to the previously known processes, the process according to the invention accordingly has the surprising advantage that the reaction is simpler to carry out (no long melting times, a low reaction temperature, no changes of viscosity and little contamination of the off-gas) and that it gives crude pigments in a particularly advantageous form from the point of view of conditioning, so that these pigments can very easily be converted to tinctorially outstanding pigments by customary after-treatments, for example heating in the presence of organic solvents.

EXAMPLE 1

36.0 kg of sulphuryl chloride, 40 kg of anhydrous aluminium chloride and 5 kg of anhydrous sodium chloride are initially introduced into a reaction vessel equipped with a reflux condenser. The suspension is warmed to 50°–60° C, 16 kg of copper phthalocyanine are introduced at this temperature over the course of 3 to 4 hours and the mixture is heated to 120°–130° C over the course of 5 to 8 hours. When the reflux of sulphuryl chloride, at a melt temperature of 95° to 100° C, has ceased, the introduction of 25 to 28 kg of chlorine is started. The rate of introduction is initially 1.2 to 1.5 kg per hour, and 0.8 to 1.0 kg per hour towards the end of the halogenation.

The melt is poured into 200 kg of water.

The mixture is heated to 90°–100° C for 1 to 2 hours whilst passing air through it and the product is then filtered off hot, washed with hot water until free from salt and dried at 80° to 120° C.

The crude pigment thus obtained has a chlorine content of 48.5 to 49.5% and is directly suitable for incorporation into numerous pigment preparations without the otherwise customary working into pastes with, or swelling in, sulphuric acid or heating with organic solvents.

If a pigment which is improved further is required, the crude pigment, as a moist filter cake or as dried material, can be subjected to a thermal after-treatment with nitrobenzene or other organic solvents, if appropriate with addition of alkalis and emulsifiers, at 80° C to 200° C.

EXAMPLE 2

33.4 kg of sulphuryl chloride, 40 kg of anhydrous aluminium chloride, 5 kg of anhydrous sodium chloride and 15.7 parts of bromine are introduced successively into a reaction vessel equipped with a reflux condenser. The melt is warmed to 35°–40° C and 11 kg of copper phthalocyanine are introduced over the course of 3 to 4 hours whilst at the same time the temperature rises from 45° to 47° C.

The mixture is heated to 110°–120° C over the course of 15 to 20 hours, a total of 9.5 kg of bromine are allowed to run in over the course of this time (approximately from 55° to 60° C), and the mixture is stirred for a further 1 to 3 hours at this temperature.

The crude pigment is isolated as described in Example 1 and contains 57 to 60% by weight of bromine and 5 to 8% by weight of chlorine.

The strongly yellowish-tinged green pigment can be used directly for various pigmentation purposes but can also be after-treated with organic solvents, as described in Example 1.

EXAMPLE 3

42 kg of sulphuryl chloride, 40 kg of anhydrous aluminium chloride, 6 kg of anhydrous sodium chloride and 14 kg of bromine are introduced successively into a reaction vessel equipped with a reflux condenser and the melt is warmed to 35°–40° C. 12 kg of copper phthalocyanine are added over the course of 3 to 4 hours whilst at the same time the temperature rises to 45°–47° C. The mixture is heated to 140° C over the course of 15 to 20 hours and is stirred for a further 3 to 5 hours at this temperature.

The working up of the melt and the further use of the crude pigment take place analogously to Example 1. The pigment contains 38 to 41% of bromine and 18 to 21% of chlorine and is yellowish-tinged green.

I claim:

1. Process for the perhalogenation of copper phthalocyanine consisting essentially of introducing copper phthalocyanine and either elemental chlorine or elemental bromine into a reaction medium consisting essentially of aluminum chloride, sulfuryl chloride and anhydrous alkali metal halide, wherein the alkali metal halide is present in an amount of from 8 to 25% by weight of aluminum chloride, and the sulfuryl chloride is present in an amount of at least 70% by weight of the aluminum chloride, at temperatures between 90 and 150° C, and perhalogenating the copper phthalocyanine in the resultant reaction medium.

2. The process of claim 1 wherein the alkali metal halide is present in an amount of 10 to 15% by weight of aluminum chloride.

3. The process of claim 1 wherein the alkali metal halide is sodium chloride and is present in an amount of 12 to 13% by weight of aluminum chloride.

* * * * *